United States Patent [19]

Atomori et al.

[11] Patent Number: 4,839,410

[45] Date of Patent: Jun. 13, 1989

[54] FLAME-RETARDANT RUBBER-MODIFIED STYRENE RESIN COMPOSITION

[75] Inventors: Seiichi Atomori, Kuwana; Teruo Inagaki, Yokkaichi; Tateki Furuyama, Yokkaichi; Akira Kamiya, Yokkaichi, all of Japan

[73] Assignee: Japan Synthetic Rubber Co., Ltd., Tokyo, Japan

[21] Appl. No.: 154,045

[22] Filed: Feb. 9, 1988

[30] Foreign Application Priority Data

Mar. 10, 1987 [JP] Japan .................................. 62-54338

[51] Int. Cl.$^4$ .............................................. C08K 5/13
[52] U.S. Cl. ...................................... 524/281; 524/384
[58] Field of Search ................................ 524/281, 384

[56] References Cited

U.S. PATENT DOCUMENTS 4,707,510 11/1987 Imai et al. ........................... 524/281

FOREIGN PATENT DOCUMENTS 49-059153 6/1974 Japan .

OTHER PUBLICATIONS

Theodore E. Tabor et al, "Decabromodiphenyl Oxide-A New Fire Retardant Additive for Plastics" *Fire Retardants: Proceedings of* 1974 *Int'l Symposium on Flammability and Fire Retardants* —Technomic Pub. Co. pp. 162-179 (1975).

*Primary Examiner*—Veronica P. Hoke
*Attorney, Agent, or Firm*—Oblon, Spivak, McClelland, Maier & Neustadt

[57] ABSTRACT

A flame-retardant rubber-modified styrene resin composition comprising, as essential components, (A) a rubber-modified styrene resin, (B) a halogenated bisphenol type polycarbonate oligomer, (C) a halogenated bisphenol type compound, and (D) a halogenated polyolefin compound. The resin composition contains these components (A), (B), (C), and (D) at specific proportions, and its contents of the components (B) and (C) must be at a specified ratio. The resin composition is not only flame-retardant but also possesses such excellent characteristics as a high degree of light resistance, heat resistance, impact resistance and fluidity when it is molded. It can be molded into articles of various shapes and has a wide variety of applications in business machines, electric appliances, and automobile parts.

15 Claims, No Drawings

FLAME-RETARDANT RUBBER-MODIFIED STYRENE RESIN COMPOSITION

BACKGROUND OF THE INVENTION

1. Field of the Invention

This invention relates to a flame-retardant rubber-modified styrene resin composition, and more particularly to a flame-retardant rubber-modified styrene resin composition which has excellent light resistance, heat resistance moldability, and impact resistance.

2. Description of the Background

Rubber modified styrene resins, represented by impact-resistant polystyrene and ABS resin, have excellent mechanical characteristics and a good electric insulating ability, and are processed or molded with ease to give articles with good outward appearances. Because of this, the rubber-modified styrene resins are widely used for a variety of industrial articles, including automobile parts, electric appliances, construction materials, and the like.

The rubber-modified styrene resins, however, are limited with respect to their field of application because of their ready flammability Specifically, various rules and regulations have been promulgated in recent years controlling the use of flammable materials in view of safety. These rules and regulations restrict the field of application of the rubber-modified styrene resins.

In addition to flame retardancy, a heat resistance of a degree which prevents the formed material from deforming at a relatively high temperature of use is required for the rubber-modified styrene resins used in some parts of business machines such as office automation business machines. Moreover, a problem in these resins recently drawing special attention is discoloration of the outer surface of the material by direct sun-light or light from a fluorescent lamp when these resins are used for sheathing the outer surfaces of machines. Good light resistance therefore is an essential property for these resins.

Accordingly, many functional properties, including not only flame retardancy but also heat resistance and light resistance, are required for the flame-retardant rubber-modified styrene resins.

For these reasons, an attempt has been made to compound a flame retardant material with a high boiling point such as, for example, a halogenated diphenylether, with the rubber-modified styrene resins to make them flame-retardant. However, the use of such a flame retardant agent causes a decline in the light resistance of the resins, although it can improve the flame retardancy and heat resistance.

When a halogenated bisphenol type polycarbonate oligomer is compounded with the resin as a flame retardant agent, it can improve the heat resistance and light resistance, but impairs the fluidity. In addition, this impact-resistant property due to improper dispersion in the resin to which it has been compounded. For these reasons resins with which such a flame retardant agent has been compounded have not been accepted as an industrially practical material.

As another attempt, a composition was proposed wherein a halogenated bisphenol type polycarbonate oligomer and a tetrahalogenated bisphenol type compound are compounded in a specific proportion (Japanese Patent Publication No. 54347/1985). However, the purpose of compounding a tetrahalogenated bisphenol type compound with rubber-modified styrene resins is directed to prevention of blooming effects and improvement of heat resistance, and cannot provide a composition with a high light resistance and heat resistance, nor one with a practical moldability and impact resistance. This composition therefore is not a satisfactory material for meeting a high degree of requirements.

In view of this situation, the present inventors have conducted extensive studies for preparing a flame-retardant rubber-modified styrene resin composition possessing excellent light resistance and heat resistance, as well as practical moldability and impact resistance. As a result, the inventors have found that these objects could be accomplished by compounding with such resins a halogenated polyolefin component at a specific proportion, in addition to a mixture of a halogenated bisphenol type polycarbonate oligomer and a tetrahalogenated bisphenol type compound at a certain ratio. The finding has led to the completion of this invention.

SUMMARY OF THE INVENTION

Accordingly, an object of this invention is to provide a flame-retardant rubber-modified styrene resin composition comprising (A) a rubber-modified styrene resin, (B) a halogenated bisphenol type polycarbonate oligomer, (C) a halogenated bisphenol type compound, and (D) a halogenated polyolefin compound, wherein 1 to 25 parts by weight of the components (B), 0.5 to 25 parts by weight of the component (C), and 0.5 to 10 parts by weight of the component (D) are compounded with 100 parts by weight of the component (A), and in which the ratio of the components (B)/(C) is within the range of 97/3 to 45/55.

Other and further objects, features and advantages of the invention will appear more fully from the following description.

DETAILED DESCRIPTION OF THE INVENTION AND PREFERRED EMBODIMENTS

Now each component used in the composition of this invention is described in detail.

Component (A): rubber-modified styrene resin

The component (A), the rubber-modified styrene resin, used for the composition of this invention is a resin obtained by polymerizing a styrene monomer, or as required copolymerizing a styrene monomer and a vinyl cyanide monomer, or other monomer which can copolymerize with the styrene or vinyl cyanide monomer, in the presence of a rubber-like polymer.

Examples of the rubber-like polymer used for preparing the component (A) are a diene-type rubber-like polymer which is typified by polybutadiene, butadiene-styrene copolymer, polyisoprene or the like, ethylene-propylene copolymer, ethylene-propylene-diene copolymer, an acrylic rubber having acrylic acid ester as a major component, isobutyleneisoprene copolymer, polyurethane rubber, and the like. Among these, particularly preferable polymers are diene-type rubber-like polymers such as polybutadiene and butadiene-styrene copolymer. Also, use of an ethylene-α-olefin type rubber-like copolymer, such as ethylene-propylenenonconjugated diene copolymer and ethylene-butene copolymer, is preferable in view of improvement of the light resistance.

There is no specific restriction to the kind of styrene monomers to be used for preparing the rubber-modified styrene resin, the component (A). Typical examples are aromatic vinyl compounds such as styrene, α-methyl styrene, p-methyl styrene, vinyl toluene, halogen substituted styrene, and the like. Among these, styrene and α-methyl styrene are particularly preferred.

Acrylonitrile and methacrylonitrile are typical examples of a vinyl cyanide monomer used for preparing the component (A).

A monomer to be copolymerized with the above monomers is an acrylic ester, methacrylic ester, or the like. Specifically, they are methyl acrylate, ethyl acrylate, methyl methacrylate, ethyl methacrylate, and the like.

In addition, such compounds as a nonconjugated divinyl compound typified by acrylic acid, methacrylic acid and divinyl benzene, and a polyvalent acrylate such as trimethylolpropane trimethacrylate, trimethylolpropane triacrylate, and the like may be used as appropriate inasmuch as the polymerization process or the composition of the present invention may not be adversely affected.

Monomers or compounds mentioned above may be used either independently or in combination with one or more others.

The component (A), the rubber-modified styrene resin, can be obtained as a graft copolymer by subjecting the above-mentioned monomers or compounds to a commonly known emulsion polymerization, suspension polymerization, solution polymerization, or bulk polymerization, in the presence of the rubber-like polymer. The graft copolymer may be used as the component (A) of the present invention as such, or it may be used mixed with a copolymer of the above monomers or compounds prepared in the absence of the rubber-like polymer.

Among these rubber-modified styrene resins, particularly preferable ones are those containing a rubber-modified styrene resin prepared using a styrene monomer and a vinyl cyanide monomer as essential components. Also, those containing resin component which is prepared by adding (meth)acrylic acid ester, in addition to the styrene monomer and vinyl cyanide monomer, are preferable because of their excellent light resistance.

Component (B): halogenated bisphenol type polycarbonate oligomer

The component (B), the halogenated bisphenol type polycarbonate oligomer used in the present invention may usually be such a compound as obtained by the reaction of a halogenated bisphenol compound and phosgene. Typical compounds are those represented by the following formulae (I) or (II):

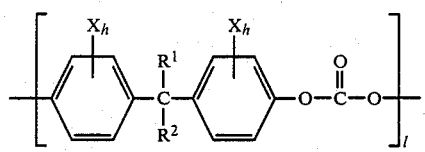

(I)

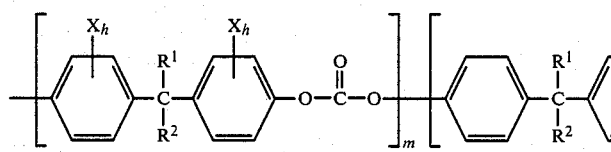

(II)

in which each X independently represents Cl or Br, each h independently denotes an integer of 1 to 4, structures in brackets are recurring units, wherein L is an integer of 2 to 50, m and n each represents an integer desirably satisfying the equation $2 \leq (m+n) \leq 50$, and $R^1$ and $R^2$ independently represent a member selected from the group consisting of hydrogen, an alkyl group having 1 - 6, preferably 1-4, carbon atoms, an alkylphenyl group, and phenyl group.

The compound represented by these formulae can be used independently or two or more of the compounds may be used as a mixture.

Specific examples of these compounds are polycarbonate oligomer of tetrabromobisphenol A, polycarbonate oligomer of tetrabromobisphenol A and bisphenol A, polycarbonate oligomer of tetrabromobisphenol S, polycarbonate oligomer of tetrabromobisphenol S and bisphenol S, polycarbonate oligomer of tetrabromobisphenol A and tetrabromobisphenol S, and the like. Both terminals of these polycarbonate oligomers may be sealed by phenols, halogenated phenols, alkylphenols, or the like, or may be left as is, i.e., a phenolic hydroxyl group or carboxyl group may remain at the terminals. It is desirable, however, that both ends be phenols, halogenated phenols, or alkylphenols, and particularly be alkylphenols in order to improve the light resistance.

The above-mentioned polycarbonate oligomer may generally be prepared by the reaction of a bisphenol type compound, for instance, bisphenol A or bisphenol S, and phosgene. A terminal-sealed oligomer may be obtained by polymerizing a bisphenol type compound under controlled conditions and using a specific catalyst. Or, alternatively, such a terminal-sealed oligomer may be obtained by adding either phenol, a halogenated phenol, or alkylphenol, as a terminator, for effecting the end termination reaction between the terminator and a halogenated bisphenol type compound.

In the above reaction of a bisphenol type compound and phosgene, a non-halogenated bisphenol type compound, for example, bisphenol A or bisphenol S, may be present and copolymerized.

The halogenated bisphenol type polycarbonate oligomer as illustrated above is compounded in the composition of the present invention at a ratio, per 100 parts by weight of rubber-modified styrene resin, of 1 to 25 parts by weight, preferably 2 to 20 parts by weight, and particularly preferably 4 to 20 parts by weight. If this ratio is less than 1 part by weight, an adequate flame retardancy and heat resistance cannot be obtained. On the other hand, the ratio of more than 25 parts by weight will result in decline of the fluidity and impact resistance.

Component (C): halogenated bisphenol type compound

The component (C), the halogenated bisphenol type compound used in the composition of the present invention is usually be a compound represented by the following formula (III):

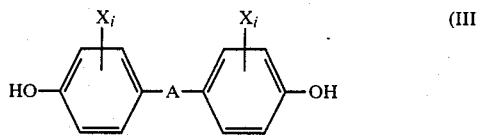

in which each X independently represents Cl or Br, each i independently denotes an integer of 1 to 4, and A represents an alkylene group or a sulfone group.

Particularly desirable compounds represented by this formula (III) are tetrabromobisphenol A and tetrabromobisphenol S. A compound represented by the formula (III) can be used independently or two or more of the compounds may be used as a mixture.

The amount of this component (C) to be compounded in the composition of the present invention is 0.5 to 25 parts by weight, preferably 0.5 to 15 parts by weight, and more preferably 0.5 to 10 parts by weight, per 100 parts by weight of rubber-modified styrene resin. The most preferable range is, however, 1 to 4.5 parts by weight per 100 parts by weight of rubber-modified styrene resin. The composition of this invention compounded with the component (C) of this range has an extremely high level of light resistance.

If this proportion is less than 0.5 part by weight, an adequate fluidity and impact resistance of the composition can not be obtained, and in addition, the effect of the combination of this component (C) and polycarbonate oligomer of the component (B) tends to be impaired. On the other hand, If the ratio is higher than 25 parts by weight, even though the fluidity and impact resistance are increased, decline of the light resistance and heat resistance are substantial, and a composition of good quality cannot be obtained.

In compounding the components (B) and (C) to the composition within the range mentioned above, it is imperative that the ratio by weight of the components (B) and (C), i.e. (B)/(C), be in a range of 97/3 to 45/55, preferably 95/5 to 50/50, and more preferably 93/7 to 60/40. If these ratios are not met, the intended effect of this invention is not likely to be achieved, and a composition with good quality can not be obtained. In the case where the above ratio (B)/(C) is less than 45/55, the composition does not exhibit adequate light resistance and heat resistance.

Component (D): halogenated polyolefin

In the present invention, compounding the components (B) and (C) with the above-mentioned rubber-modified styrene resin of the component (A) does not yet yield a product with sufficient flame retardancy, light resistance, and impact resistance. In order to further improve these characteristics, it is essential to add a halogenated polyolefin as the component (D).

The halogenated polyolefin used in this invention includes chlorinated polyethylene, chlorinated polypropylene, brominated polyethylene, brominated polypropylene, chlorinated polyethylene-polypropylene copolymer, and the like. Among these, chlorinated polyolefins, particularly chlorinated polyethylene, are preferable. It is desirable that the content of halogens in these halogenated polyolefins be in the range of 20 to 50% by weight, with the particularly desirable range being 25 to 45% by weight.

These halogenated polyolefins are used at a proportion of 0.5 to 10 parts by weight, preferably 0.5 to 8 parts by weight, per 100 parts by weight of the rubber-modified styrene resin. If this proportion is less than 0.5 part by weight, the composition obtained tends to have only insufficient flame retardancy, light resistance, and impact resistance. A proportion of more than 10 parts by weight is not desirable because the thermal stability of the composition is impaired and the heat resistance is remarkably decreased.

Other components:

In addition to the above essential components, an assisting agent with a synergistic effect on the flame retardancy can be added as an optional component to give a more desirable effect of flame retardancy or to decrease the amount of the components (B) and (C) to be added. Antimony trioxide, antimony pentoxide, stannic oxide, iron oxide, zirconium oxide, zinc borate, aluminum hydroxide, ammonium polyphosporic acid, and the like are given as specific examples of such assisting agents. Antimony trioxide is a particularly preferable assisting agent.

These assisting agents can be added in an amount of 0 to 15 parts by weight, preferably 1 to 10 parts by weight, and more preferably 2 to 8 parts by weight, per 100 parts by weight of the rubber-modified styrene resin. If the amount exceeds 10 parts by weight, the effect of the agent as a flame retardant reaches equilibrium. In addition, since such agent generally tends to decrease the impact resistance and mechanical strength of the composition, excessive addition is not desirable.

Beside the flame retardancy assisting agent, other known additives such as stabilizing agents, lubricants, and the like can be added to the rubber-modified styrene resin composition according to the present invention. Addition of a small amount of a stabilizing agent such as a phosphite, epoxy compound, organo-tin compound, stearic acid, and the like promotes the thermal stability even more at the time of molding or processing of the resin. Also, addition of a small amount of a lubricant such as hydrogenated castor oil, low-molecular weight polyethylene, silicone oil, and the like promotes the moldability of the resin.

Furthermore, a fibrous material or a filler can be added to the rubber-modified styrene resin composition of this invention to improve its heat resistance or rigidity. Examples of the fibrous material include glass fiber, asbestos, potassium titanate, a ceramic fiber, and the like, and examples of the filler are calcium carbonate, titanium oxide, barium sulfate, calcium oxide, aluminum oxide, mica, glass bead, glass flake, and the like. Other additives which are known in the art and can be added to the composition of this invention are a ultraviolet absorber such as benzotriazole type compounds, benzophenone type compounds, succinate type compounds, an antioxidant including hindered-phenol type compounds, a dispersing agent, a foaming agent, a coloring agent, and the like.

The flame-retardant rubber-modified styrene resin composition of this invention can be prepared according to a conventional process for preparing commonly known resin compositions, except that the abovementioned components which are essential to the composition of this invention are to be compounded.

Specifically, the above components (A)–(D) and other additives, as required, are mixed using a conventional Henschel type mixer, tumbler, or the like, and fused and mixed by means of a heated roll, extruder, Bambury mixer, or the like. Or, alternatively, the so-called master batch method can be employed for mixing these components, wherein a master batch with high concentrations of the components (B), (C), and (D) is first prepared by compounding in a portion of the component (A), which is then added to the remaining portion of the component (A).

The flame-retardant rubber-modified styrene composition of this invention is subsequently made into molded articles by means of, for instance, an extrusion, injection, or compression molding method. Excellent practical moldability is one of the outstanding features of this invention. Also, since these molded articles have excellent flame-retardancy, heat resistance, light resistance, and impact resistance as well as good mechanical characteristics and outward appearance, they are very useful for use in various mechanical parts, electric parts, and automobile parts.

Other features of the invention will become apparent in the course of the following description of the exemplary embodiments which are given for illustration of the invention and are not intended to be limiting thereof.

EXAMPLES

In the examples below, "part" and "%" mean "part by weight" and "% by weight", respectively. Various characteristics of the compositions prepared in the examples were evaluated according to the following methods:

(1) Combustion test

The combustion test was carried out according to the method conforming to UL 94, in which test specimens of $\frac{1}{8}'' \times \frac{1}{2}'' \times 5''$ and $1/16'' \times \frac{1}{2}'' \times 5''$ were used.

(2) Impact test

In order to evaluate practical impact resistance, the drop impact strength was measured by dropping a striking member having a circular cone end with a diameter of 12.7 mm and a 10.56 kg load from a 50 cm height onto a plate with a 2.4 mm thickness positioned on a receiving plate with a 30 mm diameter.

(3) Fluidity

In order to evaluate practical processing ability, the fluid length (cm) was measured on a mold prepared using a 5 oz injection molding machine in which a spiral die (thickness: 2 mm, width: 20 mm, gate: $2 \times 3$ mm) was used at a temperature of 220° C. and an injection pressure of 840 kg/cm².

(4) Heat resistance

The heat resistance was measured conforming to ASTM D648 using test specimens of $\frac{1}{2}'' \times \frac{1}{2}'' \times 5''$ at a load of 18.6 kg/cm².

(5) Light resistance

Color-difference ($\Delta E$) after 100 hours of weathering using a xenon weathermeter (at black panel temperature of 63° C. and without rain) was determined according to the following formula:

$$\Delta E = \sqrt{(L_o - L)^2 + (a_o - a)^2 + (b_o - b)^2}$$

wherein $L_o$, $a_o$, and $b_o$ mean brightness of color, redness and yellowness, respectively, of a test specimen before the light resistance test, and L, a, and b mean brightness of color, redness and yellowness, respectively, of a test specimen after the light resistance test. The smaller is the value of $\Delta E$, the stronger is the light resistance judged.

Examples 1–12 and Comparative Examples 1–5

Invention compositions 1 - 12 and comparative compositions 1–5 as shown in Table 1 were prepared by compounding with 100 parts of acrylonitrile-butadiene rubber-styrene copolymer resin (JSR ABS 15, ABS resin manufactured by Japan Synthetic Rubber Co., Ltd.):

(i) as the component B (flame retardant agent), compounds (B-1), (B-2), and (B-3) of the following formulae:

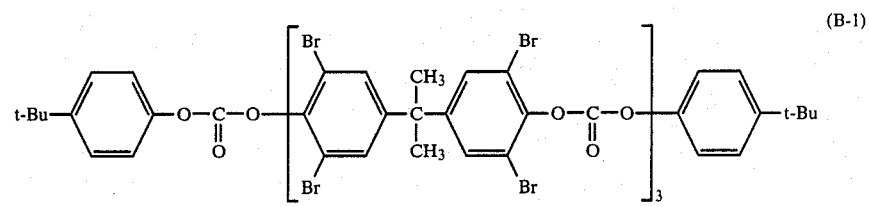

(B-1)

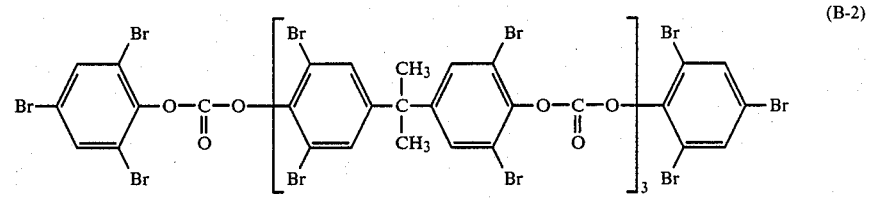

(B-2)

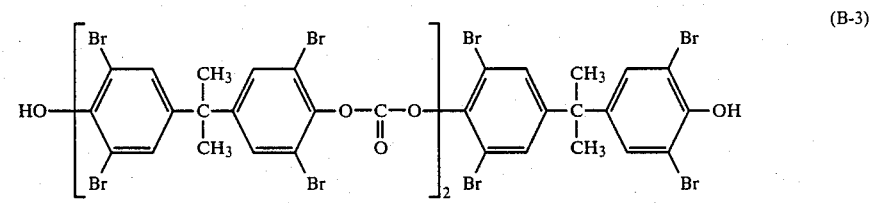

(B-3)

(ii) as the component (C), compounds (C-1) and (C-2) of the following formulae:

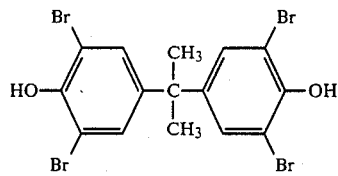

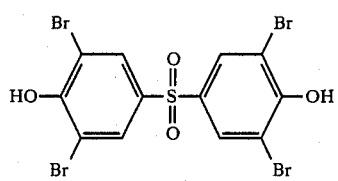

(iii) chlorinated polyethylene (chlorine content: 35%), and (iv) antimony trioxide; in the proportions shown in Table 1. To these compositions were further added 0.5 part of dibutyltin maleate and 0.5 part of stearic acid as stabilizing agents, 0.5 parts of hydrogenated castor oil and 0.05 part of silicone oil as lubricants, and 2 parts of a office gray color which consists of the following materials:

| titanium oxide | 1.67 parts |
| red iron oxide | 0.01 part |
| yellow calcined pigment | 0.09 part |
| carbon black | 0.03 part |
| magnesium stearate | 0.9 part |

These components were mixed and agitated by a Henschel type mixer, melted and kneaded at 220° C., and pelletized using a 50 mm diameter extruder with a vent to give flame-retardant rubber-modified styrene resin compositions. The characteristics of these compositions were evaluated according to the above-mentioned methods. The results are shown in Table 1.

Examples 13-16

The same evaluation was made on invention compositions 13-16 which correspond to invention compositions 1-4, respectively, except that acrylonitrile-ethylene-propylene rubber-styrene copolymer resin (JSR AES 110, ABS resin manufactured by Japan Synthetic Rubber Co., Ltd.) was used instead of acrylonitrile-butadiene rubber-styrene copolymer resin (JSR ABS 15). The results are shown in Table 1.

Example 17

The same evaluation was made on the example composition corresponding to the example composition 13, prepared in the same manner except that instead of acrylonitrile-ethylenepropylene rubber-styrene copolymer resin (JSR AES 110) an 80/20 blend of this AES 110 resin and methylmethacrylate-styrene-acrylonitrile copolymer (MSA) (a ratio of methylmethacrylate/styrene/acrylonitrile is 55/20/25) was used. The results are shown in Table 1.

Examples 18

The same evaluation was made on the invention composition 18 corresponding to the example composition 1, prepared in the same manner except that instead of acrylonitrile-butadiene rubber-styrene copolymer resin (JSR ABS 15) a 50/50 blend of the ABS 15 and AES 100 was used. The results are shown in Table 1.

TABLE 1

| Compositions (Invention/ Comparative) | Resin Composition Components and Amounts Compounded | | | | | | | | | | |
|---|---|---|---|---|---|---|---|---|---|---|---|
| | A | | | B | | | C | | D | Others | Ratio |
| | ABS | AES | MSA | (B-1) | (B-2) | (B-3) | (C-1) | (C-2) | Cl-PE* | Sb$_2$O$_3$ | B/C |
| Invention 1 | 100 | | | 16 | | | 4 | | 2.5 | 5 | 80/20 |
| Invention 2 | 100 | | | | 16 | | 4 | | 2.5 | 5 | 80/20 |
| Invention 3 | 100 | | | | | 16 | 4 | | 2.5 | 5 | 80/20 |
| Invention 4 | 100 | | | 16 | | | | 4 | 2.5 | 5 | 80/20 |
| Invention 5 | 100 | | | 19 | | | 1 | | 2.5 | 5 | 95/5 |
| Invention 6 | 100 | | | 13 | | | 7 | | 2.5 | 5 | 65/35 |
| Invention 7 | 100 | | | 10 | | | 10 | | 2.5 | 5 | 50/50 |
| Comparative 1 | 100 | | | 20 | | | | | 2.5 | 5 | 100/0 |
| Comparative 2 | 100 | | | 4 | | | 16 | | 2.5 | 5 | 20/80 |
| Comparative 3 | 100 | | | | | | 20 | | 2.5 | 5 | 0/100 |
| Invention 8 | 100 | | | 22 | | | 4 | | 2.5 | 5 | 85/15 |
| Invention 9 | 100 | | | 16 | | | 4 | | 5 | 5 | 80/20 |
| Comparative 4 | 100 | | | 16 | | | 4 | | 0 | 5 | 80/20 |
| Comparative 5 | 100 | | | 16 | | | 4 | | 12 | 5 | 80/20 |
| Invention 10 | 100 | | | 16 | | | 4 | | 2.5 | 5 | 80/20 |
| Invention 11 | 100 | | | 8 | 8 | | 4 | | 2.5 | 5 | 80/20 |
| Invention 12 | 100 | | | 16 | | | 2 | 2 | 2.5 | 5 | 80/20 |
| Invention 13 | | 100 | | 16 | | | 4 | | 2.5 | 5 | 80/20 |
| Invention 14 | | 100 | | | 16 | | 4 | | 2.5 | 5 | 80/20 |
| Invention 15 | | 100 | | | | 16 | 4 | | 2.5 | 5 | 80/20 |
| Invention 16 | | 100 | | 16 | | | | 4 | 2.5 | 5 | 80/20 |
| Invention 17 | | 80 | 20 | 16 | | | 4 | | 2.5 | 5 | 80/20 |
| Invention 18 | 50 | 50 | | 16 | | | 4 | | 2.5 | 5 | 80/20 |

| Compsitions (Invention/ Comparative) | Characteristics | | | | |
|---|---|---|---|---|---|
| | Combustion Property | | Impact Resistance | Fluidity | Heat Resistance | Light Resistance |
| | UL 94 1/8" | UL 94 1/16" | Drop Impact Strength kg · cm | Fluid Length cm | HDT °C. | ΔE |
| Invention 1 | V-0 | V-0 | 160 | 27 | 95 | 3 |
| Invention 2 | V-0 | V-0 | 170 | 25 | 93 | 3.5 |
| Invention 3 | V-0 | V-0 | 185 | 25 | 93 | 4 |

TABLE 1-continued

| | | | | | | |
|---|---|---|---|---|---|---|
| Invention 4 | V-0 | V-0 | 140 | 23 | 95 | 2.5 |
| Invention 5 | V-0 | V-0 | 100 | 24 | 96 | 2.5 |
| Invention 6 | V-0 | V-0 | 210 | 29 | 93 | 5 |
| Invention 7 | V-0 | V-0 | 230 | 30 | 91 | 6.5 |
| Comparative 1 | V-2 | V-2 | 40 | 20 | 97 | 2 |
| Comparative 2 | V-0 | V-0 | 240 | 32 | 82 | 15 |
| Comparative 3 | V-0 | V-0 | 240 | 34 | 76 | 17 |
| Invention 8 | V-0 | V-0 | 140 | 24 | 95 | 3 |
| Invention 9 | V-0 | V-0 | 160 | 29 | 93 | 2.5 |
| Comparative 4 | V-2 | V-2 | 100 | 23 | 96 | 9 |
| Comparative 5 | V-0 | V-0 | 110 | 31 | 83 | 12 |
| Invention 10 | V-1 | V-1 | 210 | 26 | 95 | 3 |
| Invention 11 | V-0 | V-0 | 160 | 25 | 94 | 3 |
| Invention 12 | V-0 | V-0 | 150 | 25 | 95 | 3 |
| Invention 13 | V-0 | V-0 | 170 | 24 | 93 | 2 |
| Invention 14 | V-0 | V-0 | 180 | 23 | 91 | 2 |
| Invention 15 | V-0 | V-0 | 190 | 23 | 91 | 3 |
| Invention 16 | V-0 | V-0 | 140 | 22 | 93 | 2 |
| Invention 17 | V-0 | V-0 | 110 | 28 | 92 | 1.5 |
| Invention 18 | V-0 | V-0 | 160 | 25 | 94 | 2 |

Now, comparison of example compositions and comparative compositions reveals the following:

(i) The comparative composition 1 is compounded with a halogenated bisphenol type polycarbonate of the component (B) independently without using the component (C). This composition has good light resistance and good heat resistance. Its impact resistance and fluidity, however, are extremely bad.

(ii) The comparative composition 2 has a ratio of the components (B)/(C) of 20/80, which is outside the scope of this invention. This composition is inferior to example compositions in its light resistance and heat resistance.

(iii) The comparative composition 3 is compounded with a halogenated bisphenol compound of the component (C) independently. This composition has good impact resistance and fluidity, but its light resistance and heat resistance are extremely bad.

(iv) On the other hand, all compositions according to the present invention exhibited a high degree of light resistance and heat resistance, and at the same time provided excellent impact resistance and fluidity.

(v) The comparative composition 4, with which chlorinated polyethylene is not compounded, exhibited flame retardancy which is extremely inferior to that of the compositions of this invention. Its light resistance and heat resistance are also inadequate.

(vi) It is thus evident that only by using components (B), (C), and (D) in combination, excellent light resistance, heat resistance, and flame retardancy can be obtained, and at the same time a high degree of impact resistance and fluidity which can withstand practical applications is provided. If either one of the requirements of the present invention is not met, the resin composition with excellent characteristics which are intended in this invention cannot be obtained.

Since the flame-retardant rubber-modified styrene resin composition according to this invention possesses excellent light resistance, heat resistance, and flame retardancy, as well as a high degree of impact resistance and fluidity which can withstand practical applications, it can be molded into not only a large-sized articles such as business machines, including office automation machines, and electric appliances, but also various articles with complicated shapes. The composition is thus an excellent material for practical applications, and has a variety of industrial applications with high commercial values.

Obviously, numerous modifications and variations of the present invention are possible in light of the above teachings. It is therefore to be understood that the scope of the appended claims, the invention may be practiced otherwise than as specifically described herein.

What is claimed as new and desired to be secured by Letters Patent is:

1. A flame-retardant rubber-modified styrene resin composition, comprising:
   (A) a rubber-modified styrene resin,
   (B) a halogenated bisphenol type polycarbonate oligomer,
   (C) a halogenated bisphenol type compound, and
   (D) a halogenated polyolefin compound having a halogen content ranging from 20 to 50% by weight, wherein 1 to 25 parts by weight of the component (B), 0.5 to 25 parts by weight of the component (C), and 0.5 to 10 parts by weight of the component (D) are compounded with 100 parts by weight of the component (A), and further wherein the molar ratio of the components (B)/(C) is within the range of 97/3 to 5/55.

2. A flame-retardant rubber-modified styrene resin composition as claimed in claim 1, wherein the component (A) is prepared by copolymerizing monomers comprising as essential components an aromatic vinyl compound and a vinyl cyanide in the presence of a rubber-like polymer.

3. A flame-retardant rubber-modified styrene resin composition as claimed in claim 1, wherein the component (B) is prepared by reacting a halogenated bisphenol type compound and phosgene.

4. A flame-retardant rubber-modified styrene resin composition as claimed in claim 1, wherein the component (B) is one or more compounds selected from the group consisting of the compounds represented by the following formulae (I) and (II):

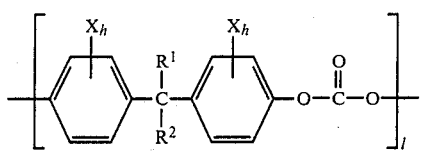 (I)

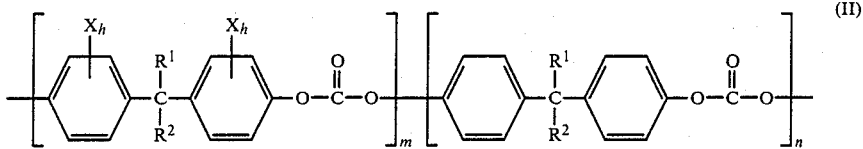 (II)

in which each X independently represents Cl or br, each h independently denotes an integer of 1 to 4, structures in brackets are recurring units, wherein l is an integer of 2 to 50, m and n each represents an integer desirably satisfying the equation $2 \leq (m+n) \leq 50$, and $R^1$ and $R^2$ independently represent a member selected from the group consisting of hydrogen, an alkyl group having 1-6 carbon atoms, an alkylphenyl group, and phenyl group.

5. A flame-retardant rubber-modified styrene resin composition as claimed in claim 1, wherein the component (B) is compounded with the component (A) in a proportion of 4 to 20 parts by weight per 100 parts by weight of the component (A).

6. A flame-retardant rubber-modified styrene resin composition as claimed in claim 1, wherein the component (C) is a compound represented by the following formula (III):

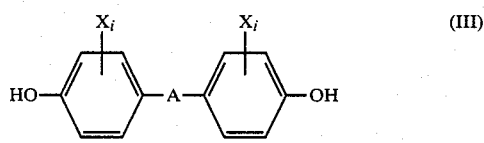 (III)

in which each X independently represents Cl or Br, each i independently denotes an integer of 1 to 4, and A represents an alkylene group or a sulfone group.

7. A flame-retardant rubber-modified styrene resin composition as claimed in claim 1, wherein the component (C) is compounded with the component (A) in a proportion of 0.5 to 15 parts by weight per 100 parts by weight of the component (A).

8. A flame-retardant rubber-modified styrene resin composition as claimed in claim 1, wherein the component (C) is compounded with the component (A) in a proportion of 0.5 to 10 parts by weight per 100 parts by weight of the component (A).

9. A flame-retardant rubber-modified styrene resin composition as claimed in claim 1, wherein the component (C) is compounded with the component (A) in a proportion of 1 to 4.5 parts by weight per 100 parts by weight of the component (A).

10. A flame-retardant rubber-modified styrene resin composition as claimed in claim 1, wherein the ratio of the components (B)/(C) is 95/5 to 50/50.

11. A flame-retardant rubber-modified styrene resin composition as claimed in claim 1, wherein the ratio of the components (B)/(C) is 93/7 to 60/40.

12. A flame-retardant rubber-modified styrene resin composition as claimed in claim 1, wherein the content of halogen in the component (D) is 25-45% by weight.

13. A flame-retardant rubber-modified styrene resin composition as claimed in claim 1, wherein the component (D) is halogenated polyethylene.

14. A flame-retardant rubber-modified styrene resin composition as claimed in claim 1, wherein the component (D) is compounded with the component (A) in a proportion of 0.5 to 8 parts by weight per 100 parts by weight of the component (A).

15. A flame-retardant rubber-modified styrene resin composition as claimed in claim 1, wherein antimony trioxide is compounded with the component (A) in a proportion of 1 to 10 parts by weight per 100 parts by weight of the component (A).

* * * * *